United States Patent [19]

Kurtti et al.

[11] Patent Number: 4,684,077

[45] Date of Patent: Aug. 4, 1987

[54] INERTIA RELEASE FOR BELT RETRACTOR WINDING PREVENTION MECHANISM

[75] Inventors: Gary R. Kurtti, East Detroit; Gregory S. Ches; David T. Brender, both of Mt. Clemens; John J. Senopole, Utica, all of Mich.

[73] Assignee: General Motors Corporation, Detroit, Mich.

[21] Appl. No.: 798,189

[22] Filed: Nov. 14, 1985

[51] Int. Cl.$^4$ .................. A62B 35/02; A65H 75/48
[52] U.S. Cl. .......................... 242/107.6; 242/107.4 A
[58] Field of Search .................. 242/107.4 A, 107.6, 242/107.7; 280/806, 807; 297/475, 476, 478, 479

[56] References Cited

U.S. PATENT DOCUMENTS

| | | | |
|---|---|---|---|
| 3,869,098 | 3/1975 | Sprecher | 242/107.6 |
| 3,973,786 | 8/1976 | Rogers, Jr. | 280/747 |
| 4,002,311 | 1/1977 | Fisher | 242/107.7 |
| 4,153,274 | 5/1979 | Rogers | 242/107.7 X |
| 4,285,479 | 8/1981 | Blom | 242/107.4 A |
| 4,386,745 | 6/1983 | Patel | 242/107.4 A X |
| 4,540,137 | 9/1985 | Rogers | 242/107.6 |
| 4,564,155 | 1/1986 | Tsukamoto | 242/107.4 A |

Primary Examiner—Stuart S. Levy
Assistant Examiner—Katherine Matecki
Attorney, Agent, or Firm—Charles E. Leahy

[57] ABSTRACT

In a seat belt retractor winding prevention mechanism, the winding prevention pawl is mounted upon a collapsible support mechanism which is collapsed by an inertia sensor at the onset of a sensed vehicle deceleration condition. The collapsible support mechanism carries a cam which engages the pawl upon collapse and moves the pawl axially out of engagement with the ratchet teeth carried by the reel to thereby release the winding prevention mechanism so that the windup spring will rewind the belt to a taut condition about the occupant. The inertia sensor raises a pilot pawl into engagement with gear teeth carried by the reel so that reel rotation energizes a further movement of the pilot pawl and the pilot pawl movement both collapses the collapsible support mechanism of the winding prevention pawl and also moves a lock bar into engagement with the reel to lock the reel against belt unwinding rotation.

3 Claims, 5 Drawing Figures

INERTIA RELEASE FOR BELT RETRACTOR WINDING PREVENTION MECHANISM

The invention relates generally to a seat belt retractor for a vehicle occupant restraint system and more particularly provides a winding prevention mechanism which is cancelled upon occurrence of predetermined level of vehicle deceleration.

BACKGROUND OF THE INVENTION

Vehicle occupant restraint belt retractors have heretofore been provided with winding prevention mechanisms for selectively relieving the tension on the belt to enhance comfort of the occupant by holding the belt at a slackened length. U.S. Pat. No. 3,869,098 by Raymond G. Sprecher, issued Mar. 4, 1975, discloses a belt retractor in which actuation of the winding prevention feature occurs in response to a predetermined sequence of belt winding and unwinding movement U.S. Pat. No. 4,153,274 by Lloyd W. Rogers, Jr. et al, issued May 8, 1979, provides a winding prevention mechanism which is manually actuated.

It is characteristic of the winding prevention mechanisms of both these patents that the winding prevention feature is cancelled in response to a predetermined extent of belt unwinding so that the winding effort of the windup spring is restored to pull the belt taut about the seated occupant. In a retractor having such a winding prevention mechanism, it is possible for the vehicle occupant to unbuckle the seat belt without having performed the belt unwinding motion necessary to cancel the winding prevention mechanism and the belt will not be retracted onto the reel. U.S. Pat. No. 3,973,786 by Lloyd W. Rogers, Jr. issued Aug. 10, 1976, provides an improvement wherein the winding prevention mechanism is automatically cancelled whenever the door is moved from the closed to the open position.

U.S. Pat. No. 4,285,479 by Hubert P. Blom, issued Aug. 25, 1981, provides a further improvement wherein the winding prevention mechanism is cancelled by an inertia sensor upon the occurrence of a sensed condition of vehicle deceleration so that the belt will be rewound to a taut condition about the occupant. In Blom, a cam member is coupled to a pendulum. Upon occurrence of a predetermined level of deceleration, the pendulum pivots and carries the cam member into engagement with a winding prevention pawl to disengage the pawl from ratchet teeth and thereby release the reel for rotation in the belt winding direction by the windup spring. The aforedescribed inertia release device of the Blom patent required a relatively large inertia weight in order to obtain the level of force required to operate the cam member to disengage the pawl from the ratchet teeth.

It was recognized that it would be desirable to provide an improved release mechanism in which a relatively small inertia weight could trigger the release of the winding prevention mechanism and permit the windup spring to pull the belt taut against the occupant. Accordingly, U.S. Pat. No. 4,540,137 issued Sept. 10, 1985 by Lloyd W. Rogers, Jr. et al provided a further improvement in which a winding prevention pawl is mounted upon a collapsible support mechanism which is collapsed by a relatively small pendulum at the onset of a sensed vehicle deceleration condition so that force imposed on the pawl by the windup spring shifts the pawl against a cam which moves the pawl axially out of engagement with the ratchet teeth carried by the reel so that the windup spring will rewind the belt to a taut condition about the occupant.

A shortcoming of the aforedescribed devices for cancelling the winding prevention mechanism in response to a sensed inertia condition is that it was necessary to add an inertia sensor to the retractor even though retractors of the vehicle sensitive inertia type already have an inertia sensor for locking the retractor against belt unwinding.

It would be desirable to provide an improved release mechanism in which a single inertia sensing pendulum could perform both the functions of cancelling out the winding prevention mechanism so that any slack would be removed from the belt and also locking the retractor against belt unwinding rotation.

SUMMARY OF THE INVENTION

A seat belt retractor according to the invention includes a windup spring normally biasing the belt reel in the belt winding direction to pull a restraint belt taut about the occupant. A lock bar is pivotally mounted on the housing and movable into engagement with the sprocket teeth to lock the reel against belt unwinding rotation. A pilot pawl mounted on the housing overlies an inertia sensing pendulum and is lifted into engagement with a gear carried by the reel so that the pilot pawl is further raised and in turn lifts the lock bar into locking engagement with the reel sprocket teeth. A disc carried by the reel has a plurality of circumferentially spaced ratchet teeth facing in the belt winding direction. A winding prevention pawl engageable with the winding facing teeth to hold the belt in a slackened condition about the occupant includes a support lever supported by an intermediate lever which is in turn supported by a trigger lever. The trigger lever overlies the pilot pawl so that the lifting of the pilot pawl by the reel gear after the pendulum has sensed the inertia condition withdraws the trigger lever from support of the intermediate lever, which in turn withdraws support from the support lever and the support lever is shifted relative the housing by an initial belt winding rotation of the reel. A cam face on the support lever engages the winding prevention pawl and moves the pawl axially out of engagement with the ratchet teeth to enable further belt winding rotation of the reel by the windup spring to pull the belt taut against the seat occupant.

The collapsible support mechanism is automatically reset by the pawl spring. The pawl spring imparts a torque on the support lever in the opposite direction to the force which had previously been imposed on the pawl and support lever by the force of the windup spring and thereby restores the support lever to its original condition of support by the intermediate lever and the trigger lever.

Accordingly the object, feature and advantage of the invention resides in the mounting of a winding prevention pawl upon a support mechanism which is collapsed by an inertia sensor to cause a cam face carried by the collapsible support mechanism to engage the pawl and move the pawl axially out of engagement with the ratchet teeth to release the reel for windup spring rotation to pull the belt taut about the seated occupant.

A further object, feature and advantage of the invention resides in the use of a pilot pawl lifted into engagement with a gear carried by the reel to further energize lifting movement of the pilot pawl to both initiate collapse of a collapsible support of a winding prevention pawl so that the windup spring effort is restored to pull the belt taut about the occupant and to also move a lock bar into engagement with the reel sprockets to lock the reel against belt unwinding rotation.

DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
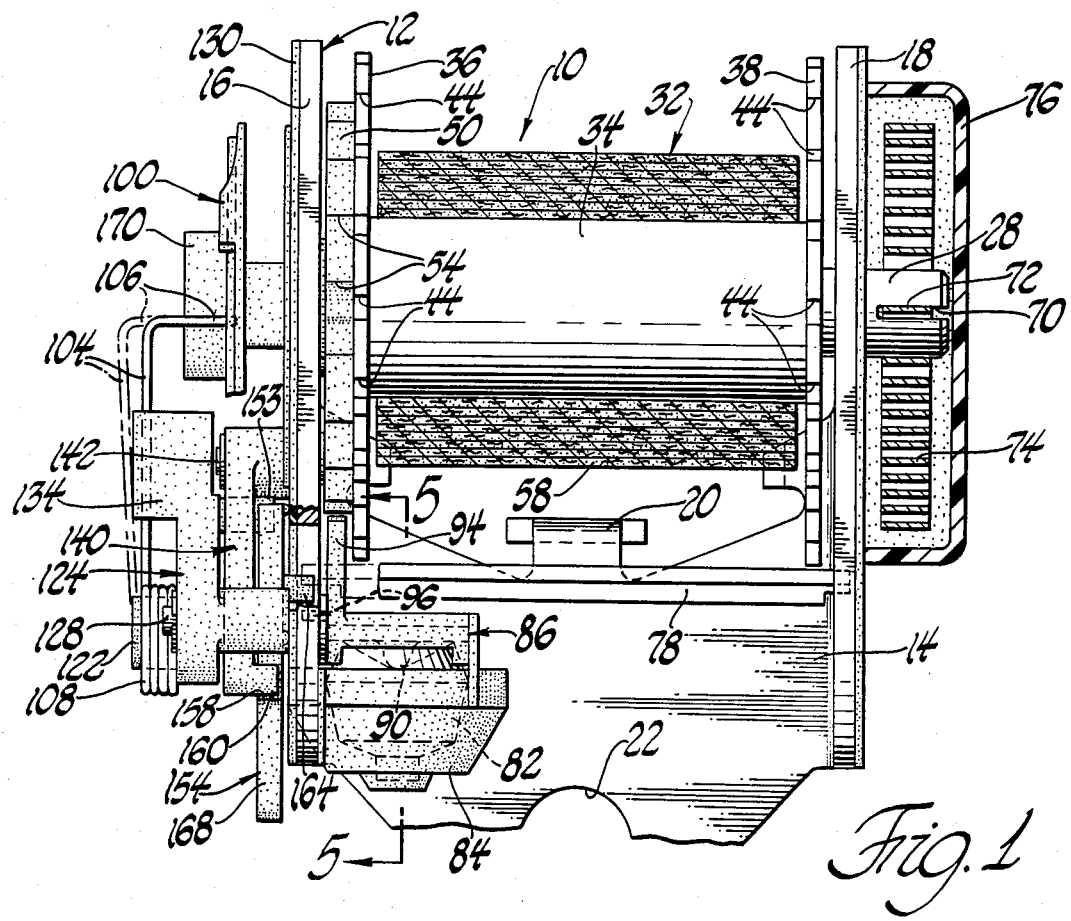
FIG. 1 is a front elevation view of a seat belt retractor according to the invention having parts broken away and in section.

Referring to FIG. 1, there is shown a seat belt retractor 10 according to the invention and having a frame 12 including a base wall 14 and laterally spaced apart side walls 16 and 18. The base wall 14 has an integral headed fastener 20 adapted to fit into an aperture in a vehicle body and an apertured boss 22 for receiving a bolt to attach the base wall 14 to the vehicle body. The side walls 16 and 18 have aligned apertures, not shown, for receiving and rotatably mounting a reel shaft 28.

As best seen in FIG. 1, a belt reel indicated generally at 32 includes a spool 34 and sprockets 36 and 38 attached to the ends of the spool 34. The sprockets 36 and 38 are attached to the reel shaft 28 so that the reel 32 and reel shaft 28 rotate together. The sprockets 36 and 38 have a plurality of circumferentially spaced sprocket teeth 44 which face in the belt unwinding direction of reel rotation. A gear 50 of molded plastic is mounted on the face of the sprocket 36 for rotation with the reel 32. The gear 50 has gear teeth 54 which face in the belt unwinding direction as best seen in FIG. 5.

A restraint belt 58 is suitably attached to the reel 32 and is unwound therefrom during rotation of the reel in the belt unwinding direction. The righthand end of the reel shaft 28 projects outwardly through the housing side wall 18 and has a slot 70 which receives the inner end 72 of a spiral windup spring 74. The outer end of the spring 74 is suitably anchored upon a spring cover 76 which is in turn attached to the frame side wall 18. The spring urges rotation of the reel 32 in the belt winding clockwise direction as viewed in FIG. 2.

Figure 5:
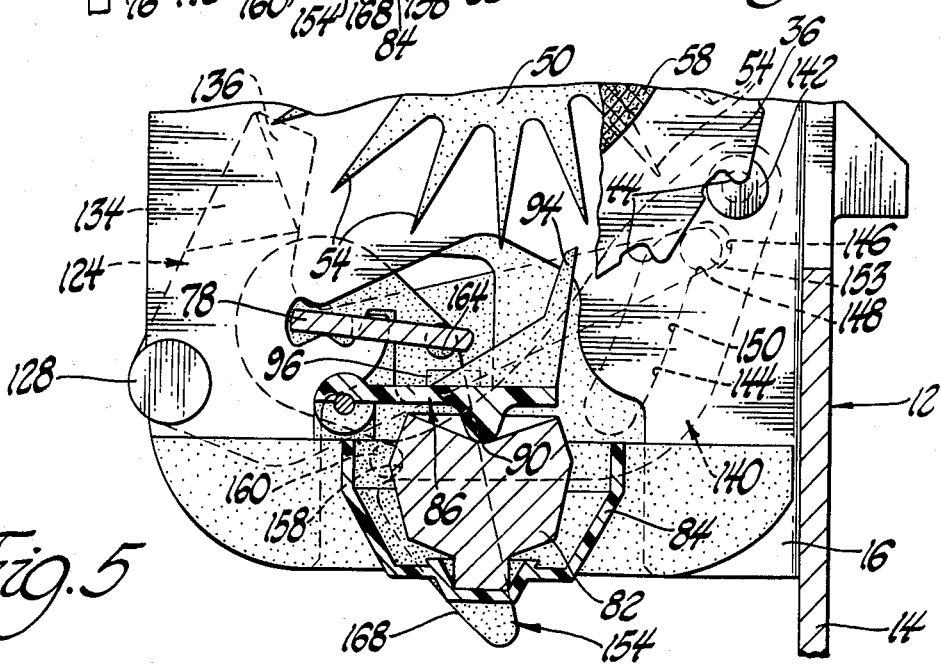
FIG. 5 is a sectional view taken in the direction of arrows 5—5 of FIG. 1.

A lock bar 78, best shown in FIG. 5, has its ends pivotally mounted in mounting slots provided in the frame side walls 16 and 18 for permitting movement of the lock bar into locking engagement with the sprocket teeth 44 of the sprockets 36 and 38 to lock the reel 32 against belt unwinding rotation. A vehicle inertia sensing mechanism is provided for operating the lock bar 78 and includes a pendulum 82 which seats in a cup 84. A pilot pawl 86 is pivotally mounted on the frame side wall 16 and includes an underside 90 which rests upon the pendulum 82 and a pawl tooth 94 which is poised beneath the gear tooth 54 of the gear 50 carried by the reel 32. When the pendulum is tilted in the cup 84 under the stimulus of a vehicle deceleration condition, the pawl tooth 94 is raised up into engagement with the gear tooth 54. Then, a belt unwinding rotation of the reel 32 induced by unwinding of the belt from the reel as the occupant torso moves forward relative the seat causes the gear tooth 54 to further pivot the pawl 86 upwardly to such an extent that the pilot pawl 86 in turn engages and raises the lock bar 78 into engagement with the sprocket teeth 44 to lock the belt reel 32 against belt unwinding rotation.

A winding prevention mechanism acts between the reel 32 and the side wall 16 to selectively lock the reel 32 against belt winding rotation by the effort of the windup spring 74 so that the belt 58 is held in a slackened condition to enhance the comfort of the seated occupant. In general, the winding prevention mechanism includes a molded plastic control disc 100 which is attached on the left-hand end of the reel shaft 28 for rotation therewith and has a plurality of ratchet teeth 102 which are selectively engageable by a pawl 104 to block the reel 32 against rotation in the belt winding direction by the windup spring 74. The control disc 100 has a series of concentric and spiral grooves which are connected by ramps and gates in a manner known to move the pawl 104 radially and axially upon occurrence of a predetermined sequence of belt winding and unwinding reel rotation in order to selectively engage and disengage the pawl 104 with the ratchet teeth 102. U.S. Pat. No. 4,002,311 by Robert C. Fisher et al, issued Jan. 11, 1977, is incorporated herein by reference and provides a further disclosure of the manner in which the control disc 100 functions to operate the pawl 104.

Figure 2:
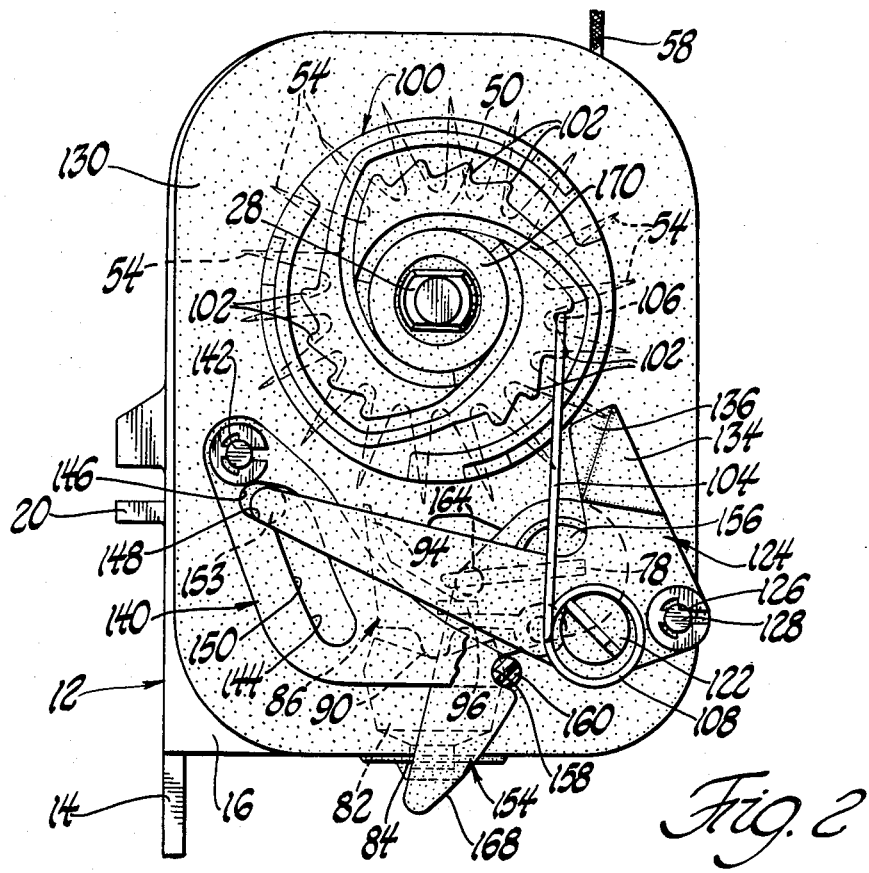
FIG. 2 is a side elevation view showing the winding prevention pawl engaged with ratchet teeth on the reel to prevent belt winding rotation and thereby hold the belt in a slackened relation about the seat occupant.

As best seen by reference to FIGS. 1 and 2, the pawl 104 is comprised of a bent wire having a pawl end 106 which projects into the groove of the control disc 100 and a base end coil 108 which is anchored on a pivot pin 122 which projects from a support lever 124. The support lever 124 has an aperture 126 which seats upon a pivot pin 128 attached to the side wall 16 and extending through a molded plastic support base 130 which overlies and is attached to the frame side wall 16. As best seen in FIG. 2, the support lever 124 carries a cam arm 134 having a cam face 136. The support lever 124 pivots between its normal position of FIGS. 2 and 3, and a collapsed position of FIG. 4.

Figure 3:
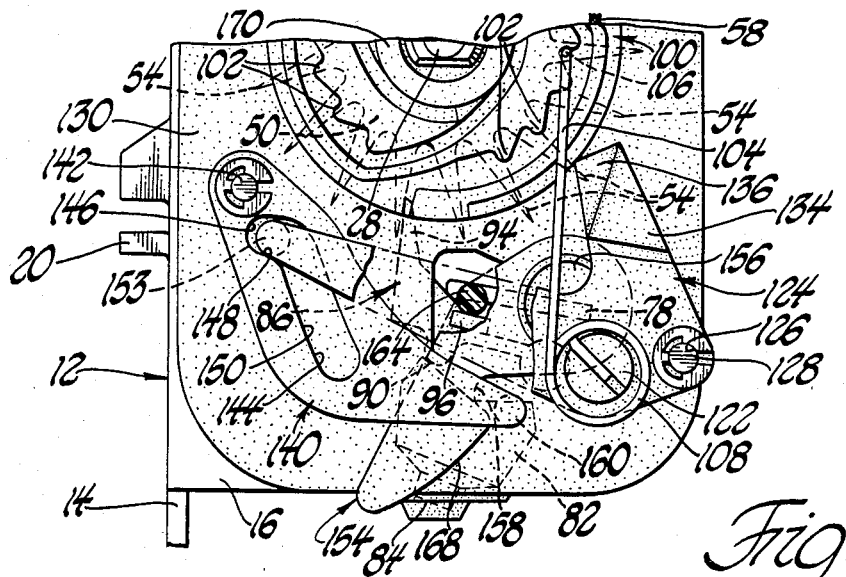
FIG. 3 is a view similar to FIG. 2 but showing the condition of the retractor subsequent to a vehicle deceleration having tilted the pendulum to actuate the lock bar and actuate a trigger lever which initiates collapse of the collapsible support mechanism supporting the winding prevention pawl.

As best seen in FIGS. 2 and 3, the support lever 124 is normally held against downward movement from its normal position of FIG. 2 by an intermediate lever 140 which is pivotally mounted on a pivot pin 142 extending from the side wall 16. The intermediate lever 140 includes a cam slot 144 having a generally horizontal upper end portion 146 which defines a shelf 148, and a generally vertical portion 150. The support lever 124 has a laterally offset cam follower pin 153 which extends laterally into the cam slot 144 of the intermediate lever 140.

The intermediate lever 140 is supported at a normal position of FIG. 2 by a trigger lever 154. The trigger lever 154 is mounted on the support base 130 by a pivot pin 156 integral with the support base 130 and has a recess 158 which receives a laterally offset pin 160 mounted on the end of the intermediate lever 140. The trigger lever 154 also has a laterally projecting arm 164, best seen in FIG. 3, which reaches through an aperture in the support base 130 and side wall 16 and overlies a laterally offset arm 96 of the pilot pawl 86 which in turn rests upon the pendulum 82 as described hereinbefore.

Operation

When a vehicle occupant enters the seat and buckles the seat belt in a restraining position, the winding prevention mechanism may be engaged to establish a slackened condition of the belt about the occupant. Referring to FIG. 2, it will be understood that a slight extension of belt from the reel subsequent to the belt having been unwound from the reel, buckled and then allowed to rewind about the occupant, will have caused the spiral groove, ramps and gates of the control disc 100 to have established the pawl 104 at the position of FIG. 2 in which the pawl end 106 is engaged with one of the ratchet teeth 102. Accordingly the pawl 104 resists further rotation of the reel 32 in the belt winding clockwise direction of rotation to hold the belt at a slackened length about the occupant. However, the windup spring 74 continues to urge winding rotation and thus imposes a downwardly acting force upon the pawl 104 and through the pivot pin 122 onto the support lever 124. The support lever 124 is in turn supported at its position of FIG. 2 by the engagement of its cam follower pin 153 with the shelf 148 of the intermediate lever 140, while the intermediate lever is supported at its FIG. 2 position by the offset pin 160 which is captured in the recess 158 of the trigger lever 154.

When the vehicle experiences a deceleration condition, it is desirable that the slack be removed from the belt so that the belt be taut about the occupant and that the belt be locked against unwinding from the retractor so that the belt will restrain the seated occupant.

The onset of the deceleration condition tilts the pendulum 82 as shown in FIG. 3. Tilting of the pendulum 82 in turn raises the pilot pawl 86 upwardly so that its tooth 94 is engaged by an oncoming tooth 54 of the gear 50 carried by the reel 32 which in turn raises the pilot pawl 86 further upwardly. Upon such upward movement, the offset arm 96 of the pawl 86 engages the lateral projecting arm 164 so that the trigger lever 154 is pivotally moved and its recess 158 is withdrawn from support of the intermediate lever 140 as shown in FIG. 3. Thus, the load imposed on the pawl 104 by the effort of the windup spring 74 and transmitted into the intermediate lever 140 by the support lever 124 will no longer be resisted with the result that the windup spring 74 is permitted to initiate belt rewinding rotation of the reel 32 and thereby shift the pawl 104 downwardly as permitted by rotary movement of the support lever 124 to the FIG. 4 collapsed position as the cam follower pin 153 rides along the cam slot 144, thereby pivoting the intermediate lever 140 to its collapsed position of FIG. 4. While the intermediate lever 140 is in the collapsed position, a cam tail 168 of the trigger lever 154 holds the trigger lever 154 at its disabled position of FIG. 4.

Figure 4:
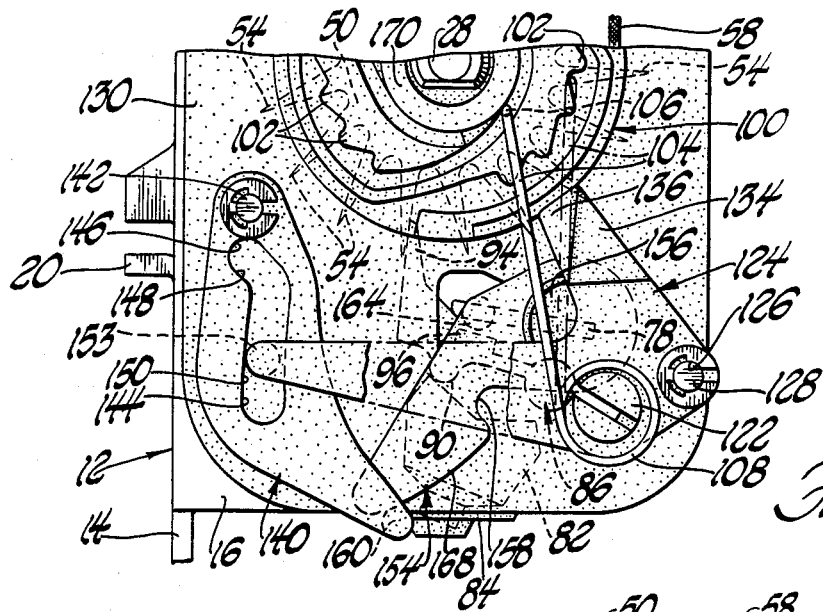
FIG. 4 is a view similar to FIG. 3 but showing the collapsed position of the collapsible support mechanism.

As best seen in FIG. 4, the pivoting movement of the support lever 124 to the collapsed position of FIG. 4 causes the cam face 136 of the support lever 124 to engage the pawl 104 so that the end 106 of the pawl 104 is pivoted axially away from the ratchet tooth 102. Thus, the winding prevention mechanism is released and the windup spring 74 is permitted to rewind the belt taut about the occupant. Upon axial movement of the pawl 104 out of engagement with the ratchet tooth 102, the base end coil 108 of the pawl 104 pivots the pawl 104 counterclockwise relative to its pivot pin 122 from the phantom line indicated position of FIG. 4 to the solid line indicated position of FIG. 4 in which the pawl end 106 comes into engagement with a central shoulder portion 170 of the control disc 100.

In addition to cancelling the winding prevention mechanism as described hereinbefore, the upward movement of the pawl 86 also pivotally raises the lock bar 78 into engagement with the teeth 44 of the sprocket plates 36 and 38 so that the reel 32 is locked against rotation in the belt unwinding direction.

As soon as the pawl end 106 engages the central shoulder 170, the torque of the base end coil 108 of the pawl 104 imparts a moment on the support lever 124 in the clockwise direction about its pivot 128 to pivotally raise and reset the support lever 124 to its position of FIG. 2. During such pivotal movement of the support lever 124, the cam follower pin 153 of the support lever 124 rides along the cam slot 144 of the intermediate lever 140 to pivot the intermediate lever 140 to its FIG. 2 position in which the offset pin 160 is again captured in the recess of the trigger lever 154 as gravity returns the trigger lever 154 to its normal position of FIG. 2. Thus the mechanism automatically resets to restore the winding prevention mechanism for subsequent actuation to resist the effort of the windup spring 74 when the pawl 104 is again engaged with a ratchet tooth 102.

Thus it is seen that the invention provides a collapsible support structure for the winding prevention pawl and an inertia triggered device which is actuated by the same inertia sensor which locks the retractor against belt unwinding reel rotation upon the onset of a vehicle deceleration condition. The collapse of the support structure carries a cam into coaction with the pawl which axially displaces the pawl out of engagement with the teeth on the reel so that the windup spring can rotate the reel in the belt winding direction to pull the belt taut about the occupant. Furthermore, it is seen that the collapsible support structure and winding prevention mechanism automatically reset when the deceleration condition is terminated. More particularly, as soon as the pawl is disengaged from the ratchet teeth of the disc carried by the reel, the pawl is pivoted radially inward by the pawl spring to engage a shoulder of the disc so that the pawl is stopped against further movement. At that point the effort of the pawl spring imposes a moment upon the support lever which returns the support lever to its normal raised position, which in turn returns the intermediate lever to its normal raised position while gravity returns the trigger to its normal position supporting the intermediate lever which in turn supports the support lever.

The embodiments of the invention in which an exclusive property or privilege is claimed are defined as follows:

1. A seat belt retractor comprising:
    a housing;
    a belt reel rotatably mounted on the housing and having a first plurality of circumferentially spaced ratchet teeth facing in the belt winding direction, a second plurality of circumferentially spaced ratchet teeth facing in the belt unwinding direction, and a gear having teeth facing in the unwinding direction;
    a windup spring imposing force urging rotation of the reel in the belt winding direction to pull the belt taut against a seat occupant;

a lock bar mounted on the housing and selectively movable into engagement with the unwinding facing ratchet teeth to lock the reel against belt unwinding rotation;

a winding prevention pawl selectively engageable with the winding facing ratchet teeth to block belt winding rotation by resisting the force imposed by the windup spring so that the belt is held in a slackened condition about the occupant;

a support lever pivotally mounted on the housing;

mounting means mounting the winding prevention pawl on the support lever;

trigger and intermediate means supporting the support lever against movement by force imposed on the lever by the effort of the windup spring when the winding prevention pawl is engaged with the winding facing ratchet teeth carried by the reel;

inertia sensing means;

a pilot pawl movable into engagement with the gear teeth by the inertia sensing means so that unwinding reel rotation causes further movement of the pilot pawl;

the pilot pawl including engagement means which engage both the lock bar and the trigger and intermediate means to both withdraw the trigger and intermediate means from support of the support lever so that the support lever is shifted relative the housing by the force of the windup spring and move the lock bar into engagement with the unwinding facing ratchet teeth in response to said further movement of the pilot pawl; and cam means carried by the support lever acting to move the pawl axially out of engagement with the ratchet teeth in response to said shifting movement to enable further belt winding rotation of the reel by the windup spring to pull the belt taut against the seat occupant.

2. A seat belt retractor comprising:

a housing;

a belt reel rotatably mounted on the housing and having a first plurality of circumferentially spaced ratchet teeth facing in the belt winding direction, a second plurality of circumferentially spaced ratchet teeth facing in the belt unwinding direction, and a gear having teeth facing in the unwinding direction;

a windup spring imposing force urging rotation of the reel in the belt winding direction to pull the belt taut against a seat occupant;

a lock bar mounted on the housing and selectively movable into engagement with the unwinding facing ratchet teeth to lock the reel against belt unwinding rotation;

a winding prevention pawl selectively engageable with the winding facing ratchet teeth to block belt winding rotation by resisting the force imposed by the windup spring so that the belt is held in a slackened condition about the occupant;

a collapsible support mechanism carrying the winding prevention pawl to normally support the winding prevention pawl against movement by force imposed thereon by the effort of the windup spring when the winding prevention pawl is engaged with the winding facing ratchet teeth carried by the reel;

inertia sensing means;

a pilot pawl movable into engagement with the gear teeth by the inertia sensing means so that unwinding reel rotation causes further movement of the pilot pawl;

the pilot pawl including engagement means which engage both the lock bar and the collapsible support mechanism to both trigger a collapse of the collapsible support mechanism and move the lock bar into engagement with the unwinding facing ratchet teeth in response to said further movement of the pilot pawl; and cam means acting to move the winding prevention pawl out of engagement with the winding facing ratchet teeth in response to collapse of the collapsible support mechanism to enable further belt winding rotation of the reel by the windup spring to pull the belt taut against the seat occupant.

3. A seat belt retractor comprising:

a housing;

a belt reel rotatably mounted on the housing and having a first plurality of circumferentially spaced ratchet teeth facing in the belt winding direction, a second plurality of circumferentially spaced ratchet teeth facing in the belt unwinding direction, and a gear having teeth facing in the unwinding direction;

a windup spring imposing force urging rotation of the reel in the belt winding direction to pull the belt taut against a seat occupant;

a lock bar mounted on the housing and selectively movable into engagement with the unwinding facing ratchet teeth to lock the reel against belt unwinding rotation;

a winding prevention pawl selectively engageable with the winding facing ratchet teeth to block belt winding rotation by resisting the force imposed by the windup spring so that the belt is held in a slackened condition about the occupant;

a collapsible support mechanism carrying the winding prevention pawl to normally support the winding prevention pawl against movement by force imposed thereon by the effort of the windup spring when the winding prevention pawl is engaged with the winding facing ratchet teeth carried by the reel;

inertia sensing means;

a pilot pawl movable into engagement with the gear teeth by the inertia sensing means so that unwinding reel rotation causes further movement of the pilot pawl;

the pilot pawl including engagement means which engage both the lock bar and the collapsible support mechanism to both trigger a collapse of the collapsible support mechanism so that the collapsible support mechanism and the winding prevention pawl are shifted relative one another by the force of the windup spring and move the lock bar into engagement with the unwinding facing ratchet teeth in response to said further movement of the pilot pawl; and cam means acting between the collapsible support mechanism and the winding prevention pawl to move the winding prevention pawl out of engagement with the winding facing ratchet teeth in response to said shifting movement to enable further belt winding rotation of the reel by the windup spring to pull the belt taut against the seat occupant.

* * * * *